INVENTOR.
GLENN B. SHOEMAKER
ATTORNEY

United States Patent Office 3,145,298
Patented Aug. 18, 1964

3,145,298
SECANT FUNCTION GENERATOR
Glenn B. Shoemaker, Ivyland, Pa., assignor to the United States of America as represented by the Secretary of the Navy
Filed Apr. 3, 1962, Ser. No. 184,861
3 Claims. (Cl. 235—197)
(Granted under Title 35, U.S. Code (1952), sec. 266)

The invention herein described may be manufactured and used by or for the Government of the United States of America for governmental purposes without the payment of any royalties thereon or therefor.

This invention relates to a longitude-latitude computer and more particularly to a longitude-latitude computer and display system for computing and indicating instantaneous position of an aircraft in flight.

It is highly desirable for pilots of high speed aircraft to have available a continuous display of instantaneous aircraft position in terms of degrees longitude and degrees latitude. Before the advent of highly complicated supersonic aircraft, a pilot had the means and the time to compute position by conventional navigation computations. These days, however, the removal of such chores from a pilot is a necessity if he is to maintain maximum efficiency on strategic missions.

Where inputs of airspeed and heading or ground position of an aircraft in flight are available, computation of instantaneous longitude and latitude is accomplished by the mechanization of simple geometric equations or formulae. However, desirable characteristics for any airborne device or instrument are that it be uncomplicated, light in weight, compact and small. Such characteristics are usually attained only at a sacrifice of sensitivity and accuracy.

The present state of the art is exemplified by latitude-longitude computers wherein ball-disc integrators are used for the computation of longitude. For most purposes the use of ball-disc integrators has proved practical. However, at high speeds at high latitudes such an arrangement is subject to intolerable slippage. One such instrument has a useful range between the latitudes 70° N. and 70° S.

A longitude-latitude computer normally must mechanize some form of the following two equations:

(1) Lat° (present position)

$$= \text{Lat}° \text{ (initial position)} \pm \int_{\text{to}}^{t_1} \text{speed } dt$$

(2) Long° (present position)

$$= \text{Long}° \text{ (initial position)} \pm \int_{\text{to speed } x}^{t_1} \sec (\text{lat}) \, dt$$

As may be seen by observation of the two formulas, latitude is a straightforward mathematical computation and is easily obtainable when North-South distance traveled is known. However, as an aircraft increases distance from the equator, the meridians converge and meet at the poles. In other words, as latitude increases, the distance an aircraft must travel to make equal changes in longitudinal degrees decreases. It has been found that as latitude or distance North or South of the equator increases, the convergence of meridians is a function of the secant of the latitude change. All longitude-latitude computers must incorporate or compensate for this non-linearity. Previously discussed prior art devices utilize ball-disc integrators to accomplish the compensation. However, such prior art computers degrade in accuracy a considerable amount beyond latitudes 70° N. and 70° S.

The present invention contemplates a longitude-latitude computer utilizing a unique arrangement for incorporating or compensating for meridian convergence. The present invention contemplates a system for the highly accurate computation of latitude and longitude of an aircraft between 85° N. and 85° S. at aircraft ground speeds as high as 1200 knots. Whereas in prior art arrangements the error at 70° latitude is as high as 1.5 percent, the present invention has a theoretical error of only .5 percent at 85° latitude.

It is an object of the present invention to provide a longitude-latitude computer and indicator which accurately compensates for meridian convergene between latitudes 85° S. and 85° N.

Another object of the present invention is to provide a longitude-latitude computer for computing latitudes and longitudes accurately at high latitudes at aircraft ground speeds as high as 1200 knots.

A further object of the present invention is to provide a simplified, compact, lightweight, accurate longitude-latitude computer for use in high speed aircraft wherein the latitude and longitude positions of the aircraft are computed and displayed instantaneously and continuously to a pilot.

A still further object of the present invention is to provide a longitude-latitude computer and display wherein the non-linear secant function necessary to compensate for meridian convergence is uniquely generated with high accuracy between 85° N. and 85° S. latitudes.

Other objects and advantages of the invention will hereinafter become more fully apparent from the following description of the annexed drawings, which illustrate a preferred embodiment and wherein.

Figure 1:
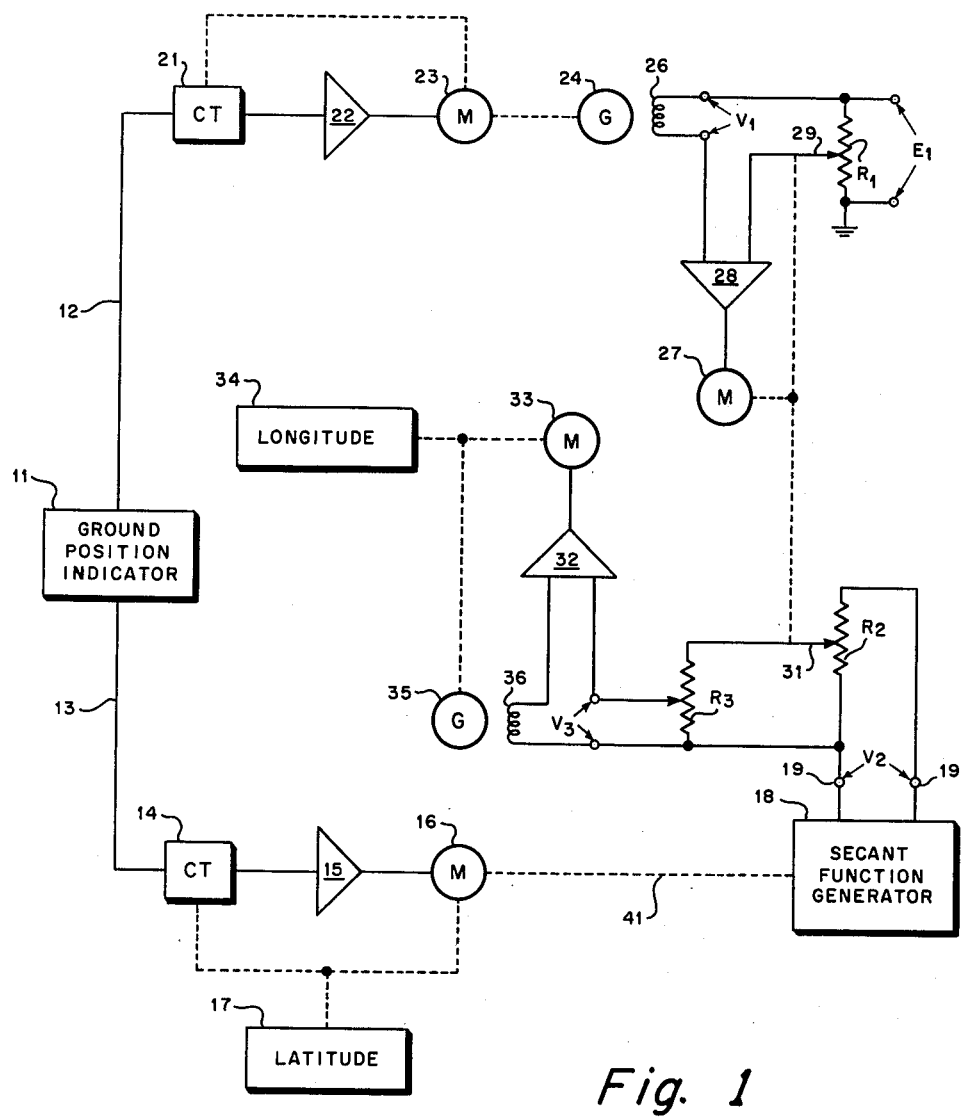
FIG. 1 illustrates partly in block diagram and partly in schematic form the longitude-latitude computer and display system of the present invention.

Referring now to FIG. 1 there is shown a ground position indicator 11 of a type normally found in high speed aircraft. The ground position indicator 11 at conductor 12 provides a voltage output representative of the East-West speed of the aircraft. At the same time, ground position indicator 11 provides at conductor 13 a voltage output representative of a North-South speed of the aircraft.

Latitude of an aircraft is a function of its distance North and South of the equator. Thus, the output of the ground position indicator 11 may be made directly proportional to the latitude. The North-South ground position indicator output is fed into control transformer 14. The output of control transformer 14 is amplified in amplifier 15 and used to energize motor 16. Control transformer 14, amplifier 15 and motor 16 together comprise a conventional followup system wherein the output of motor 16 is fed back to control transformer 14 to null the output of control transformer 14. The rotational output of motor 16 is directly proportional to speed of the aircraft in the North-South direction. The total r.p.m. of shaft 41 is indicative of latitude and is summed in latitude indicator 17 to indicate instantaneous latitude continuously. The mechanical output of motor 16 is also fed into secant function generator 18 via shaft 41 where it is converted into a secant function and made available at the output terminals 19 of secant function generator 18 as a voltage. Secant function generator 18 is more fully disclosed and described in connection with FIG. 2.

If change in longitude were directly proportional to East-West distance traveled by the aircraft, the output on conductor 12 of ground position indicator 11 would be sufficient after going through the same process as the output of conductor 13 to provide an indication of longitude. However, as aforesaid, East-West distance traveled to effect a degree change in longitude differs for various distances from the equator.

The East-West output of ground position indicator 11 is fed to control transformer 21 to drive motor 23 via amplifier 22 accordingly. The rotational output of motor 23 is proportional to East-West speed and drives generator 24 which provides a voltage $V_1$ across coil 26 of generator 24 which is proportional to East-West speed. The output of motor 23 is also fed back to control transformer 21 for nulling purposes. The voltage proportional to East-West speed is used to drive motor 27 via amplifier 28. The mechanical output of motor 27 is used to move wiper arms 29 and 31 in tandem across resistors $R_1$ and $R_2$, respectively. When voltage $V_1$ becomes equal to balance voltage $E_1$ the input to motor 27 becomes zero. When this occurs, wiper arm 31 is positioned on resistor $R_2$ such that the voltage across resistor $R_3$ is the product of East-West speed and the secant of the latitude. The product voltage across resistor $R_3$ drives the motor 33 via amplifier 32. The output of motor 33 drives longitude indicator 34 which sums the r.p.ms. of motor 33 to indicate longitude of the aircraft. At the same time, motor 33 also drives generator 35 to match voltage $V_3$, thereby nulling the input to motor 33 when longitude indicator 34 is correctly indicating the present longitude.

Figure 2:
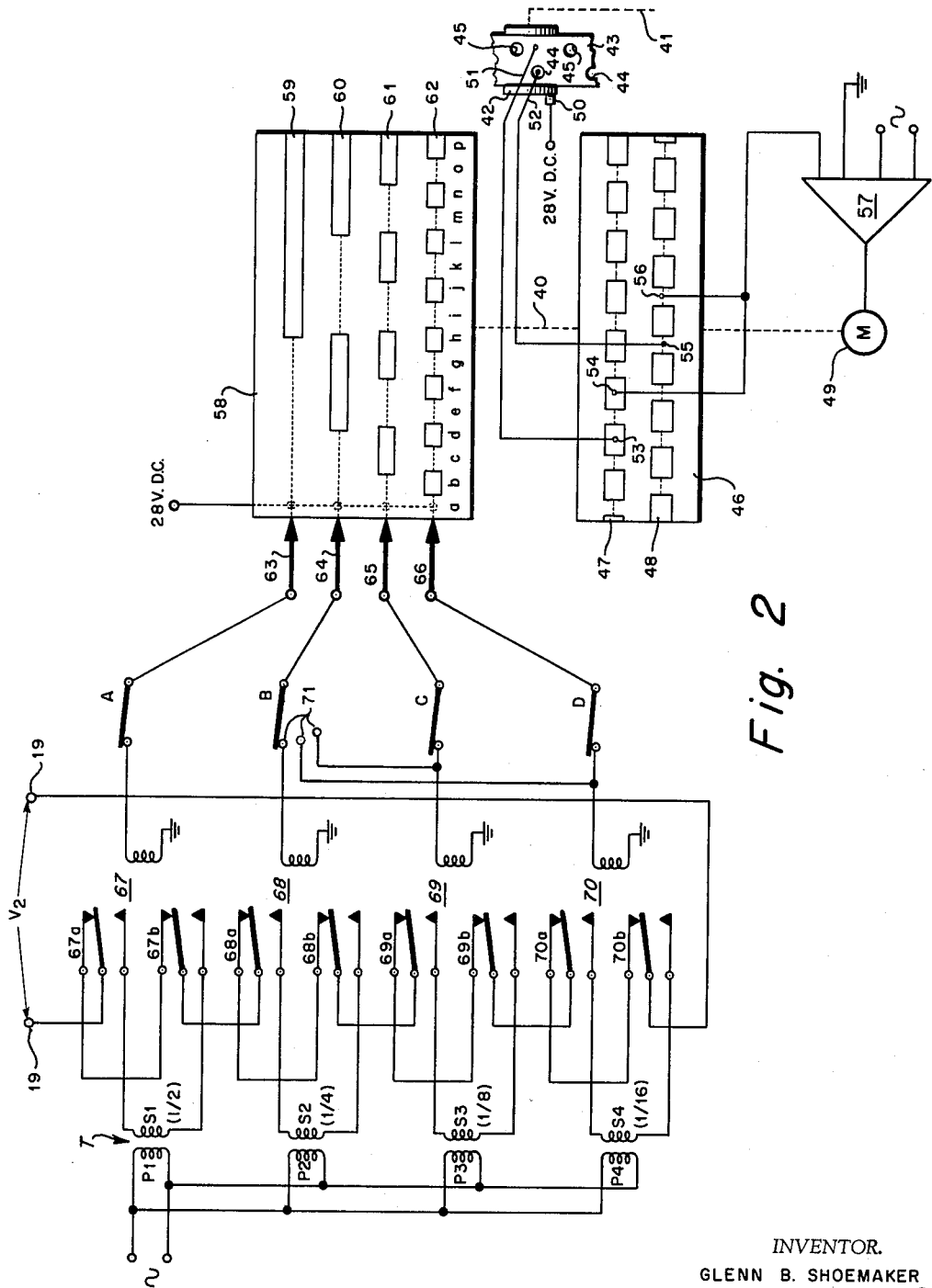
FIG. 2 illustrates the secant function generator of FIG. 1.

Referring now to FIG. 2, there is shown the secant function generator 18 of this invention. The arrangement by which the non-linear secant function voltage $V_2$ is generated is shown in FIG. 2. The purpose of the configuration shown in FIG. 2 is to provide voltage $V_2$ which varies in an incremental amount according to the secant of the latitude. This is done by use of an incrementally variable transformer. The secant function generator comprises a transformer T. Transformer T comprises four primary windings $P_1$ through $P_4$ parallely connected across a source of energizing alternating current. The respective transformation ratios difference from one set $P_1$, $S_1$ to the next set $P_2$, $S_2$ is two. As the latitude of the aircraft changes, various ones of the transformer secondaries are connected together in series. Therefore, the voltage $V_2$ may be made to change incrementally dependent upon the various combinations of secondary windings which are connected across the terminals 19. A cylinder 42 composed of conductive material is driven by motor 16 via shaft 41 at a rate proportional to North-South speed of the aircraft. Cylinder 42 drives punched tape 43 over its surface. Tape 43 has a supply reel and a takeup reel, the actual configuration of which forms no part of this invention.

Secant non-linearity is obtained from the predetermined irregular spacing of the series of holes 44 and 45 of the tape. A disc 46, shown unfolded, comprises two series or channels of equally spaced conductive coatings 47 and 48. The spaces on the surface of the disc between the conductive coatings are electrically insulating but each conductive strip is electrically connected to one another below the surface of the disc in a manner suggested by the dotted lines.

Disc 46 is driven by stepping motor 49 in a manner described below. When hole 44 of tape 43 passes conductive wiper arm 52, a 28 volt D.C. supply is applied to one of the segments 47, as shown, thereby completing a circuit between wipers 53 and 54 and supplying motor 49 via amplifier 57 with an energizing potential which causes motor 49 to drive disc 46 until the circuit between wiper arms 53 and 54 is broken. Accordingly, when a hole 45 in tape 43 passes wiper arm 51, wiper arms 55 and 56, which at that time will be on adjacent segments 48 of disc 46 will again complete an energizing circuit to motor 49 causing disc 46 to step. It should be noted that the time that arms 51 or 52 are in contact with cylinder 42 is long compared to the time for stepping disc 46.

Disc 46 is mechanically connected to and rotates disc 58 via shaft 40. Disc 58, shown unfolded, is made up of four separate channels 59, 60, 61 and 62. Each of the channels comprises a surface which is one-half conductive and one-half non-conductive. However, channel 62 comprises eight equally spaced, equal in size conductive segments. Channel 61 comprises four equally spaced, equal in size conductive segments. Channel 60 comprises two equally spaced, equal in size conductive segments, whereas channel 59 comprises one conductive segment extending continuously throughout one-half of the circumference of disc 58. Each of the conductive segments in each of the channels 59 through 62 are electrically interconnected and has thereto applied a 28 volt D.C. source of voltage.

Any hole which passes wiper arm 51 or 52 causes stepping motor 49 to step disc 58 one notch of 16 separate positions $a$ through $p$. Each channel 59 through 62 has a wiper 63 through 66, respectively. Each wiper arm in each channel is associated with a separate relay 67 through 70, respectively. Thus, when wiper 63 is on the conductive segment of channel 59, the coil of relay 67 is energized. This causes switch arms 67a and 67b to move from the position shown to connect secondary $S_1$ across terminals 19. As can be seen, each of the step positions of disc 58 give a different combination of relays 67 through 70 which are enregized. Thus, there are 16 separate combinations by which secondaries $S_1$ through $S_4$ may be connected across terminals 19. Therefore, the secant function voltage $V_2$ is continuously variable within the limits set by the smallest transforation ratio which in this case is that of $S_4$ or $1/16$. The advantage of this is that of controlled definition of the secant value is obtained.

Obviously, the incremental changes in the voltage may be decreased by increasing the number of channels and step positions of disc 58 or by adding discs similar to disc 58 in tandem with it in a geared down relationship. Each of relays 67 through 68 may by simple addition of energizing terminals and manipulating switches A through D be energized via different ones of channels 59 through 62. For example, terminals 71 associated with switch B show how several relays might be energized via a single channel.

Obviously many modifications and variations of the present invention are possible in the light of the above teachings. It is therefore to be understood, that within the scope of the appended claims, the invention may be practiced otherwise than as specifically described.

What is claimed is:

1. A secant function generator providing an incrementally variable voltage proportional to the secant of the instantaneous latitude of an aircraft, comprising in combination:

a rotatable disc having a plurality of encircling channels thereon, each of said channels comprising conductive and nonconductive portions, power supply means applying a voltage to said conductive portions, motor means for stepping said rotatable disc throughout a plurality of positions according to the secant function of the latitude, a plurality of relays, a plurality of conductors, each of said conductors connected at one end to one of the coils of said plurality of relays and at the other end as a wiper arm to one of said plurality of channels, a plurality of transformers having primary coils connected in parallel to a common source, first switch means associated with each of said plurality of relays connecting various combinations of the secondary coils of said plurality of transformers in series according to the particular one of said plurality of positions that said disc occupies whereby the voltage across said various combinations of said secondary coils is proportional to the secant of the instantaneous latitude of the aircraft.

2. A secant function generator according to claim 1 wherein said motor means comprises:
- a stepping motor drivingly connected to said rotatable disc,
- a source of voltage,
- second switch means connected between said stepping motor and said source of voltage for energizing said stepping motor at intervals which occur at a predetermined rate according to the secant of the latitude.

3. A secant function generator according to claim 2 wherein said second switch means comprises:
- tape means having holes punched therein at irregular spacings which follow a predetermined pattern representative of a secant function,
- conductive cylinder means connected to said ground position indicator means for driving said tape means past the surface of said conductive cylinder means at a rate proportional to North-South speed of the aircraft,
- voltage means connected to said conductive cylinder means,
- conductor means connected at one end to said stepping motor and at the other end in wiping engagement with said tape means for stepping said stepping motor one position as each of said holes passes the surface of said cylinder.

References Cited in the file of this patent
UNITED STATES PATENTS

| | | |
|---|---|---|
| 2,403,152 | Roters | July 2, 1946 |
| 3,022,500 | Stupar | Feb. 20, 1962 |